United States Patent
Montealegre et al.

(10) Patent No.: US 11,328,195 B2
(45) Date of Patent: May 10, 2022

(54) TRANSACTION CARD ASSEMBLY

(71) Applicant: Capital One Services, LLC, McLean, VA (US)

(72) Inventors: Andrea Montealegre, Arlington, VA (US); William F. Carroll, II, Huntingtown, MD (US); Bryant Yee, Washington, DC (US); Daniel Marsch, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 80 days.

(21) Appl. No.: 16/867,075

(22) Filed: May 5, 2020

(65) Prior Publication Data

US 2021/0350194 A1  Nov. 11, 2021

(51) Int. Cl.
*G06K 19/07*  (2006.01)
*G06K 19/06*  (2006.01)
*G06Q 20/34*  (2012.01)

(52) U.S. Cl.
CPC ..... *G06K 19/072* (2013.01); *G06K 19/06187* (2013.01); *G06Q 20/3572* (2013.01)

(58) Field of Classification Search
CPC ................ G06K 19/044; G06K 19/04; G06K 19/07743; G06K 19/07716; G06K 19/077; G06K 19/07354; G06K 19/0707; G06K 19/06187; G06K 19/07327; G06K 19/041; G06K 19/063; G06K 19/06206; G06K 19/0719; G06K 19/072; G06K 19/0721; G06K 19/06196; G06Q 20/341; G06Q 20/347; G06Q 20/3415; G06Q 20/342; G06Q 20/343; G06Q 20/352; G06Q 20/3574; G06Q 20/3555; G06Q 20/3572; G06Q 20/355; G06Q 20/3278
See application file for complete search history.

(56) References Cited

U.S. PATENT DOCUMENTS

| | | | |
|---|---|---|---|
| 7,370,805 B2 | 5/2008 | Smith et al. | |
| 8,328,106 B1 | 12/2012 | Trujillo | |
| 9,275,386 B2 | 3/2016 | Olson et al. | |
| 2006/0131396 A1* | 6/2006 | Blossom | G06Q 20/3572 235/380 |
| 2007/0267502 A1* | 11/2007 | Zellner | G06K 19/06187 235/487 |

(Continued)

*Primary Examiner* — Thien T Mai
(74) *Attorney, Agent, or Firm* — Kacvinsky Daisak Bluni PLLC (57) ABSTRACT

Provided are approaches for providing multiple user accounts in a same transaction card assembly. The transaction card assembly may include a first card including a first card first side opposite a first card second side, the first card first side including a first pair of magnetic stripes and the first card second side including a first pair of identification chips. The transaction card assembly may further include a second card coupled to the first card, the second card including a second card first side opposite a second card second side, the second card first side including a second pair of magnetic stripes, and the second card second side including a second pair of identification chips. The first and second cards are slidable relative to one another between multiple positions to selectively expose and cover each identification chip of the first and second pairs of identification chips.

20 Claims, 7 Drawing Sheets

(56) References Cited

U.S. PATENT DOCUMENTS

| | | | |
|---|---|---|---|
| 2010/0044446 A1* | 2/2010 | Shah | G09F 3/0297 |
| | | | 235/494 |
| 2012/0085826 A1* | 4/2012 | Talker | G07F 7/0833 |
| | | | 235/492 |
| 2013/0161390 A1* | 6/2013 | Rodriquez | G06K 19/07743 |
| | | | 235/441 |
| 2020/0334665 A1* | 10/2020 | Regen | H04M 1/0254 |
| 2020/0394370 A1* | 12/2020 | Garrett | G06Q 20/353 |

* cited by examiner

501
Coupling a First Card to a Second Card, Each of the First and Second Cards Having a First Main Side Opposite a Second Main Side, Wherein the First Main Side Includes a Pair of Magnetic Stripes Separated from One Another on Opposite Sides of the First Main Side Wherein the Second Main Side Includes a Pair of Identification Chips Separated from one Another on Opposite Ends of the Second Main Side, and Wherein the Second Main Side of the First Card and the Second Main Side of the Second Card Face One Another 503
Sliding the First and Second Cards Relative to One Another Between Multiple Positions to Selectively Isolate Each Magnetic Stripe of Each Pair of Magnetic Stripes and to Selectively Expose and Cover Each Identification Chip of Each Pair of Identification Chips

FIG. 7

TRANSACTION CARD ASSEMBLY

FIELD

Embodiments of the present disclosure relate to transaction cards and, more particularly, to transaction card assemblies including a plurality of accounts.

BACKGROUND

Transaction cards, such as credit cards and debit cards, typically contain account information such as the account number, owner's name, and expiration date. This information may be provided in different formats, and at different positions along the card. In one format, text is embossed into or printed on the card for use visually. In a second format, a magnetic stripe containing the information in a computer-readable form may be provided along the back of the card. In a third format, information is contained on an identification chip coupled to the card.

It is common for most people to own multiple transaction cards. However, it may be cumbersome or otherwise undesirable to carry all transaction cards at the same time. It is with respect to this and other drawbacks of the prior art that the present disclosure is provided.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

In at least one approach according to the disclosure, a card assembly may include a first card having a first card first side opposite a first card second side, the first card first side including a first pair of magnetic stripes separated from one another and the first card second side including a first pair of identification chips separated from one another. The card assembly may further include a second card coupled to the first card, the second card including a second card first side opposite a second card second side, the second card first side including a second pair of magnetic stripes separated from one another and a the second card second side including a second pair of identification chips separated from one another, wherein the first card second side and the second card second side face one another, and wherein the first and second cards are slidable relative to one another between multiple positions to selectively expose and cover each identification chip of the first and second pairs of identification chips.

In another approach according to the disclosure, a transaction card assembly may include a first card coupled to a second card, each of the first and second cards having a first main side opposite a second main side, wherein the first main side includes a pair of magnetic stripes separated from one another on opposite sides of the first main side, wherein the second main side includes a pair of identification chips separated from one another on opposite ends of the second main side, wherein the second main side of the first card and second cards are slidable relative to one another between multiple positions to selectively expose and cover each identification chip of each pair of identification chips.

In yet another approach according to the disclosure, a method may include coupling a first card to a second card, each of the first and second cards having a first main side opposite a second main side, wherein the first main side includes a pair of magnetic stripes separated from one another on opposite sides of the first main side, wherein the second main side includes a pair of identification chips separated from one another on opposite ends of the second main side, and wherein the second main side of the first card and the second main side of the second card face one another. The method may further include sliding the first and second cards relative to one another between multiple positions to selectively expose and cover each identification chip of each pair of identification chips.

BRIEF DESCRIPTION OF THE DRAWINGS

The accompanying drawings illustrate example approaches of the disclosure, including the practical application of the principles thereof, as follows.

The drawings are not necessarily to scale. The drawings are merely representations, not intended to portray specific parameters of the disclosure. The drawings are intended to depict example embodiments of the disclosure, and therefore are not be considered as limiting in scope. In the drawings, like numbering represents like elements.

Furthermore, certain elements in some of the figures may be omitted, or illustrated not-to-scale, for illustrative clarity. The cross-sectional views may be in the form of "slices", or "near-sighted" cross-sectional views, omitting certain background lines otherwise visible in a "true" cross-sectional

DETAILED DESCRIPTION

The present embodiments will now be described more fully hereinafter with reference to the accompanying drawings, where some embodiments are shown. The subject matter of the present disclosure may be embodied in many different forms and are not to be construed as limited to the embodiments set forth herein. These embodiments are provided so this disclosure will be thorough and complete, and will fully convey the scope of the subject matter to those skilled in the art. In the drawings, like numbers refer to like elements throughout.

Embodiments herein are directed to a transaction card assembly performing the functions of at least four (4) separate transaction cards. In some embodiments, the transaction card assembly may include two (2) cards configured to slide or move with respect to one another in multiple directions. Each card may have a pair of magnetic stripes and a pair of identification chips (e.g., EMV chips). Sliding the cards relative to one another may selectively expose or isolate some of the magnetic stripes and some of the identification chips. As a result, physical space may be saved by including a plurality of cards together in a same transaction card assembly.

Referring now to FIGS. 1-4, an example transaction card assembly (hereinafter "assembly") 100 according to embodiments of the disclosure will be described. The assembly 100 may include a plurality of credit or debit cards, a RFID passport, and/or an access card. As will be described in greater detail herein, the assembly 100 may include a plurality of account information formats, such as multiple magnetic stripes and identification chips, which are linked to various transaction card accounts. As such, a user may select between four different accounts.

As shown, the assembly 100 may include a first card 102 coupled with a second card 104. The first card 102 may include a first/front side 106 opposite a second/back side 108. The second card 104 may similarly include a first/front side 110 opposite a second/back side 112. As shown, the second side 108 of the first card 102 faces the second side 112 of the second card 104 when the first and second cards 102, 104 are coupled together. Described in greater detail herein, the first card 102 and the second card 104 each include a plurality of magnetic stripes 130 and a plurality of identification chips 132. During use, the first and second cards 102, 104 are slidable relative to one another to selectively expose and cover each of the identification chips 132 and to selectively isolate each of the magnetic stripes 130.

Figure 1A:
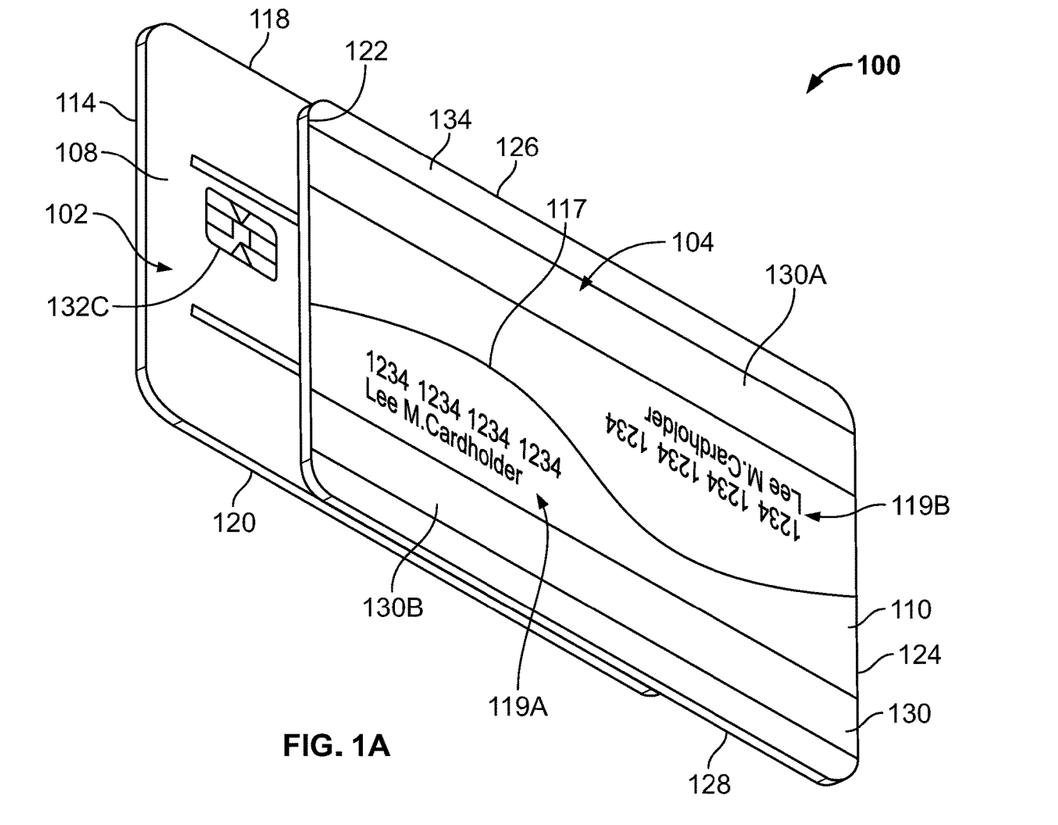
FIG. 1A is a perspective view illustrating a transaction card assembly, in accordance with embodiments of the present disclosure.
Figure 1B:
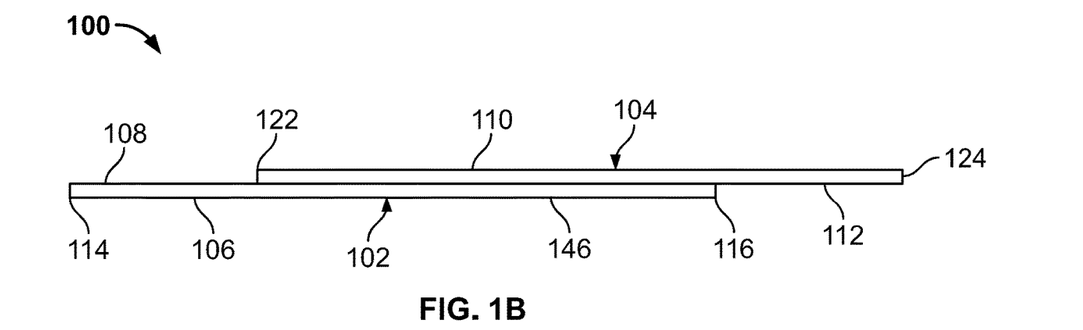
FIG. 1B is side view of the transaction card assembly of FIG. 1A, in accordance with embodiments of the present disclosure.
Figure 1C:
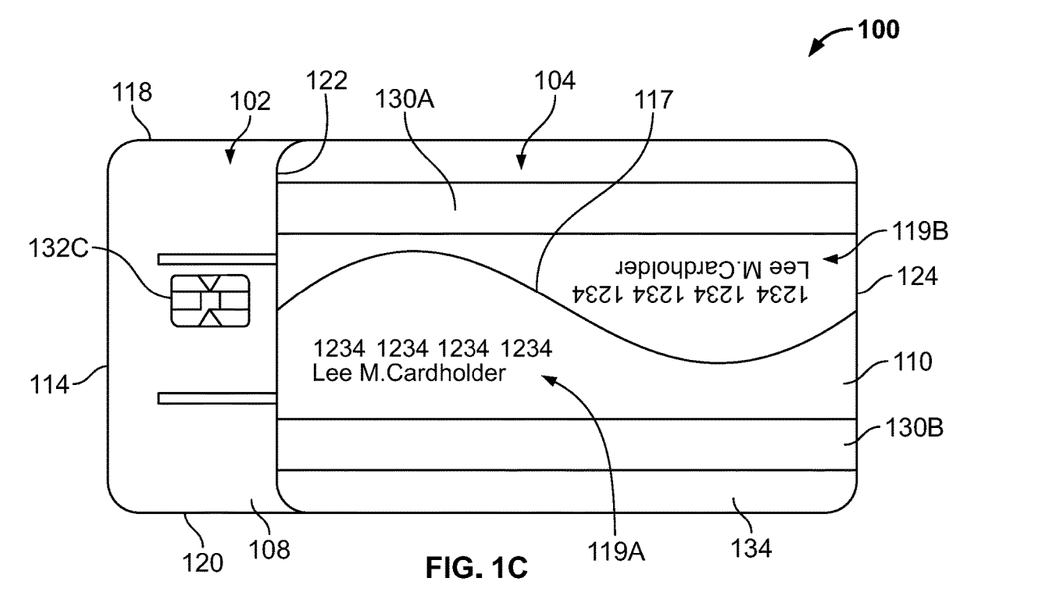
FIG. 1C is a top view of the transaction card assembly of FIG. 1A, in accordance with embodiments of the present disclosure.
Figure 1D:
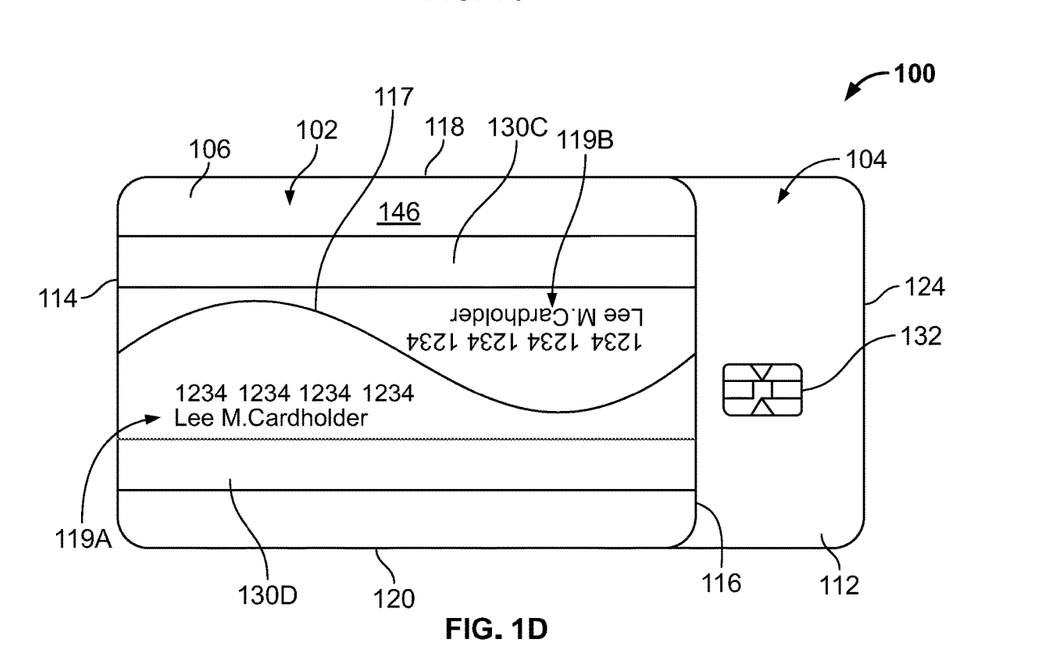
FIG. 1D is a bottom/back view of the transaction card assembly of FIG. 1A, in accordance with embodiments of the present disclosure.

The first card 102 may include a first end 114 opposite a second end 116, and a first side 118 opposite a second side 120. Similarly, the second card 104 may include a first end 122 opposite a second end 124, and a first side 126 opposite a second side 128. In some embodiments, the first and second cards 102, 104 are the same size and thickness.

As further shown, the first side 106 of the first card 102 and first side 110 of the second card 104 may include contain graphics 117 and/or identifying indicia 119A-119B, such as an account holder name and/or a card number. Identifying indicia 119A may correspond to a first user account (e.g., debit, credit, etc.), while identifying indicia 119B may correspond to a second user account. As such, at least four (4) accounts may be present in the assembly 100. Although non-limiting, the card number may be a 16-digit number (e.g., four groups of four digits). In other embodiments, the card number may include a different number of digits. The identifying indicia may be printed over/on an exterior layer of the first and second cards 102, 104. However, one skilled in the art will appreciate that the printing of the identifying indicia, along with any other indicia, logos, etc., may be applied to any surface or layer of the assembly 100. Moreover, any suitable printing, scoring, imprinting, marking or like method is within the scope of the present disclosure.

Figure 2A:
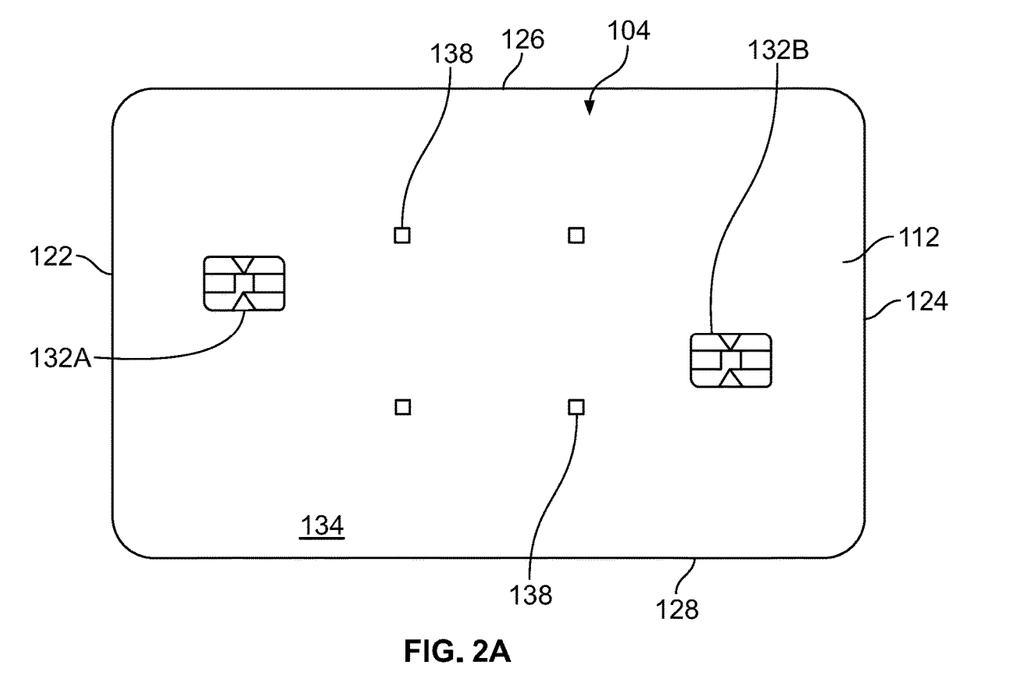
FIG. 2A is a top view of a card of the transaction card assembly of FIG. 1A, in accordance with embodiments of the present disclosure.

The second card 104 may include a pair of magnetic stripes 130A-130B separated from one another along the first side 110. In some embodiments, the magnetic stripes 130A-130B extend between first and second ends 122, 124. As further shown, the magnetic stripes 130A-130B may be disposed adjacent the first side 126 and the second side 128, respectively. In some embodiments, the magnetic stripes 130A-130B may be part of an exterior layer 134 extending over the first side 110. In other embodiments, the magnetic stripes 130A-130B may be separate components or layers disposed atop or beneath the exterior layer 134.

The magnetic stripes 130A-130B may contain cardholder data in accordance with standard protocols. For example, in some embodiments, each of the magnetic stripes 130A-130B includes three tracks, often designated as track 1, track 2, and track 3. Many payment cards, such as credit cards or debit cards, have a magnetic stripe that includes two tracks, such as a magnetic stripe that includes tracks 1 and 2. Other cards have a magnetic stripe that includes three tracks. Many card readers can read a magnetic stripe that includes three tracks, and in cases where the payment card includes a magnetic stripe with only two tracks, the card reader's ability to read a third track is unused. In non-limiting embodiments, when the magnetic stripes 130A-130B are encoded with account data of the assembly 100 using two tracks, the account data of the assembly 100 can be encoded in tracks 1 and 2. Track 3 of the magnetic stripes 130A-130B may be unused and devoid of valid data in such a situation. Embodiments herein are not limited in this context, however.

As further shown, the second card 104 may include a pair of identification chips 132A-132B coupled (e.g., recessed or partially embedded) to the second side 112. As used herein, the identification chips 132A-132B may be any microprocessor device configured to exchange data electromagnetically, such as an EMV or RFID chip. The RFID chip may include a radio frequency inductor, volatile or non-volatile memory storage, a microprocessor, circuitry logic, and/or an antenna. While in some embodiments electromagnetic data communications from the RFID chip will take place at radio frequencies, other embodiments may exchange electromagnetic data at different frequencies. Although only two identification chips 132A-132B are shown, it will be appreciated that a greater number of identification chips is possible.

Although not shown, the second card 104 may further include one or more additional transaction components, such as a Near Field Communication (NFC) antenna, Bluetooth® device, WiFi device, etc. In some embodiments, an NFC antenna may be arranged around and/or beneath each of the identification chips 132A-132B.

Figure 2B:
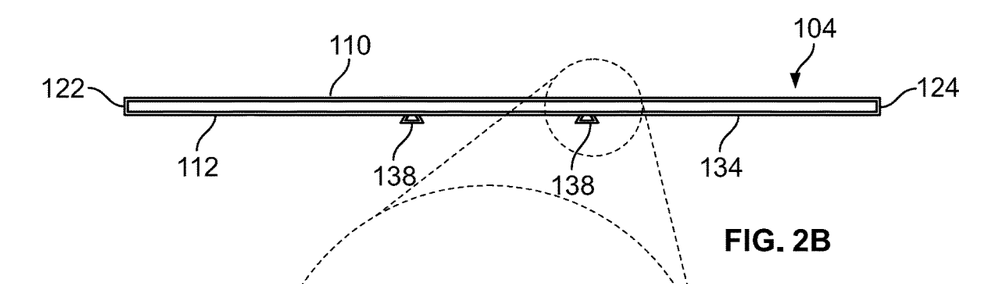
FIG. 2B is a side view of the card of FIG. 2A, in accordance with embodiments of the present disclosure.
Figure 2C:
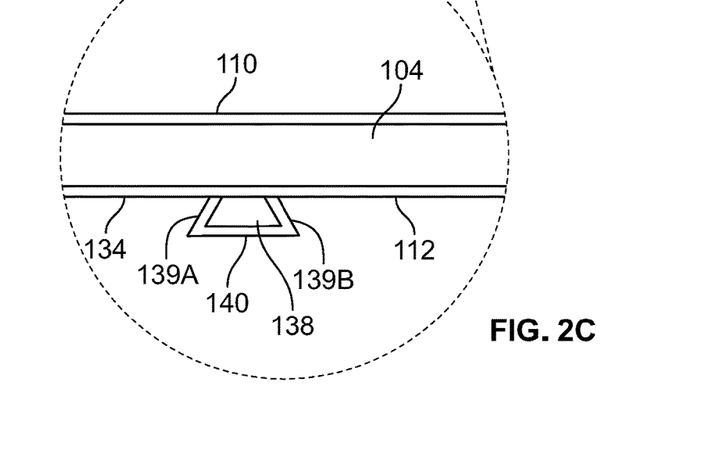
FIG. 2C is a side view of a portion of the card of FIG. 2B, in accordance with embodiments of the present disclosure.

As best shown in FIGS. 2A-2C, the second card 104 may further include a plurality of supports 138 (e.g., tabs) extending from the second side 112. Although non-limiting, the supports 138 may be arranged to generally form a square. In some embodiments, the supports 138 are positioned towards an interior of the second card 104, between the pair of magnetic stripes 130A-130B, and between the pair of identification chips 132A-132B. As best shown in FIG. 2C, each of the supports 138 may include a first side wall 139A and a second sidewall 139B connected by an end wall 140. The first and second sidewalls 139A, 139B may extend at a non-zero angle relative to a plane oriented perpendicular to the second side 112 of the second card 104. Said another way, the first and second sidewalls 139A, 139B may angle away from one another. In other embodiments, the first and second sidewalls 139A, 139B may be oriented substantially parallel to one another. As will be described in greater detail herein, the supports 138 may be retained within a set of channels of the first card 102.

Referring to FIGS. 1A-1D and 3A-3B, the first card 102 of the assembly 100 will be described in greater detail. As shown, the first side 106 of the first card 102 may include a pair of magnetic stripes 130C-130D separated from one another. In some embodiments, the magnetic stripes 130C-130D extend between first and second ends 114, 116. As further shown, the magnetic stripes 130C-130D may be disposed along the first side 118 and the second side 120, respectively. In some embodiments, the magnetic stripes 130A-130B may be part of an exterior layer 146 extending over the first side 106. In other embodiments, the magnetic stripes 130C-130D are separate components or layers disposed atop or beneath the exterior layer 146.

Figure 3A:
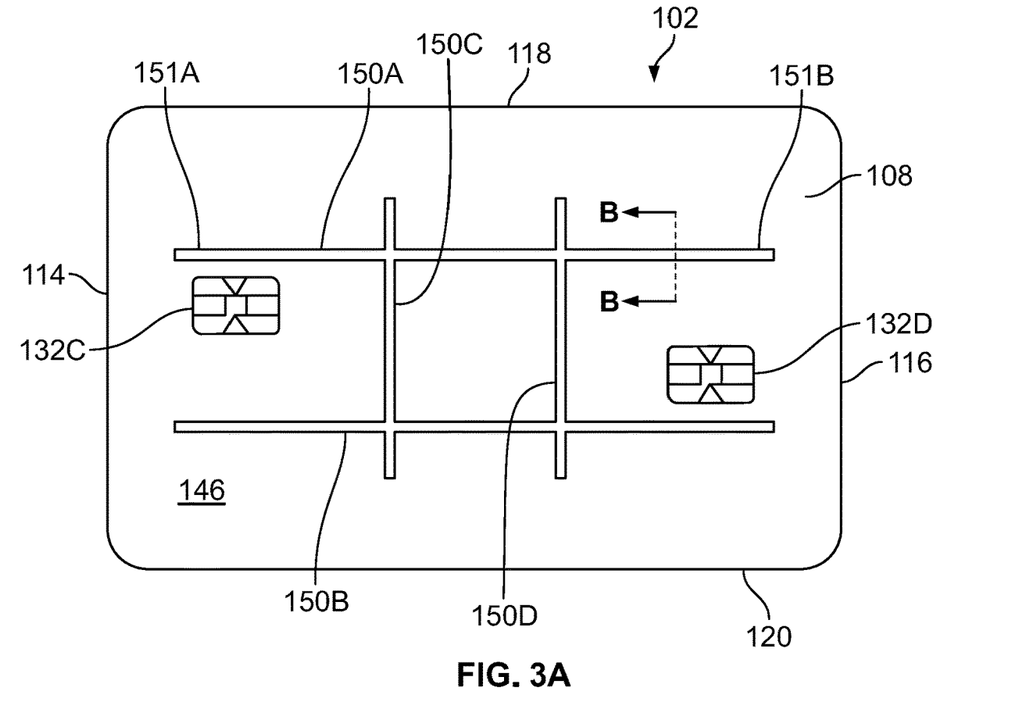
FIG. 3A is a top view of a second card of the transaction card assembly of FIG. 1A, in accordance with embodiments of the present disclosure.
Figure 3B:
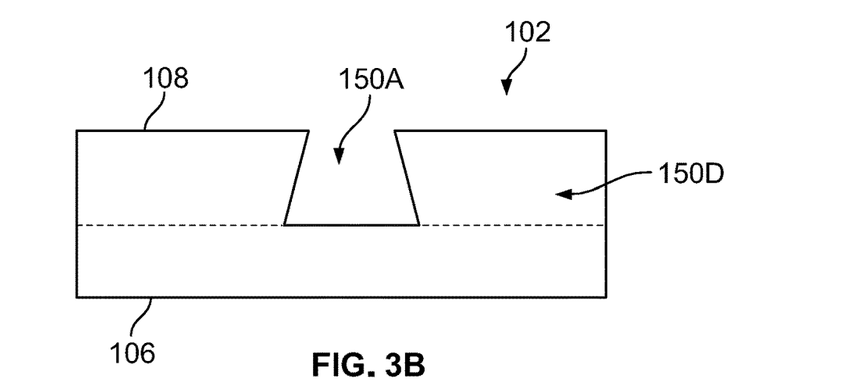
FIG. 3B is a side cross-sectional view of the card FIG. 3A, along cutline B-B, in accordance with embodiments of the present disclosure.

As further shown, the first card 102 may include a pair of identification chips 132C-132D coupled (e.g., recessed or partially embedded) to the second side 108. Although only two identification chips 132C-132D are shown, it will be appreciated that a greater number of identification chips is possible. Furthermore, the first card 102 may include one or more additional transaction components, such as a Near Field Communication (NFC) antenna, Bluetooth® device, WiFi device, etc. In some embodiments, an NFC antenna may be arranged around and/or beneath each of the identification chips 132C-132D.

As best shown in FIG. 3A, the first card 102 may further include a set of channels 150A-150D extending into the second side 108. As shown, a first channel 150A may extend parallel to a second channel 150B, and a third channel 150C may extend parallel to a fourth channel 150D. The first and second channels 150A-150B may be parallel to the third and fourth channels 150C-150D. In some embodiments, the first and second channels 150A-150B may be substantially parallel to the magnetic stripes 130C-130D on the first side 106. As further shown, the first and second channels 150A-150B may intersect the third and fourth channels 150C-150D to form a grid, which is located between the pair of magnetic stripes 130C-130D.

In some embodiments, each of the channels 150A-150D may include first and second end walls. For example, the first channel 150A may include a first end wall 151A and a second end wall 151B. As shown, the first and second end walls 151A, 151B are at opposite sides of the first channel 150A. It will be appreciated that the second, third, and fourth channels 150B-150D may include similar end walls. As will be described in greater detail herein, the end walls of the channels 150A-150D may limit movement of the first and second cards 102, 104 relative to one another.

During use, the supports 138 of the second card 104 are seated within the first and second channels 150A-150B or within the third and fourth channels 150C-150D, depending upon a relative position of the first and second cards 102, 104. For example, the supports 138 may be positioned within the first channel 150A and the second channel 150B to move the second card 104 towards the first end 114 of the second end 116 or the first card 102. The supports 138 may be positioned within the third channel 150C and the fourth channel 150D to move the second card 104 towards the first side 118 of the second side 120 of the first card 102. When the first and second cards 102, 104 are aligned with one another, the supports 138 may be positioned at the intersections of the first, second, third, and fourth channels 150A-150D.

Figure 4:
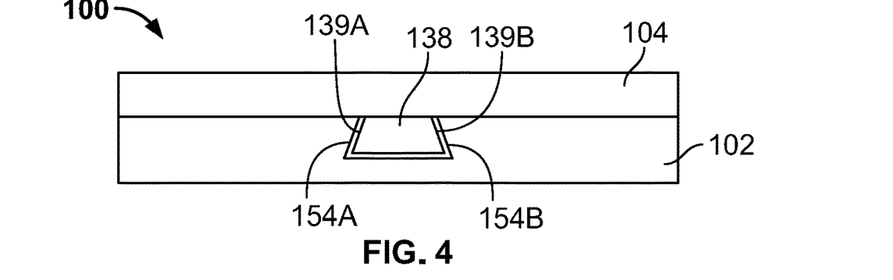
FIG. 4 is a side cross sectional view of a portion of the card assembly of FIG. 1A, in accordance with embodiments of the present disclosure.

As shown in FIG. 4, in some embodiments, the first and second sidewalls 139A, 139B of the supports 138 may engage corresponding first and second trench sidewalls 154A, 154B. The relative angles of the first and second sidewalls 139A, 139B and the first and second trench sidewalls 154A, 154B may cause the supports 138 to remain within the channels 150A-150D. It will be appreciated that various alternative configurations of the supports and the channels 150A-150D are possible.

Figure 5A:
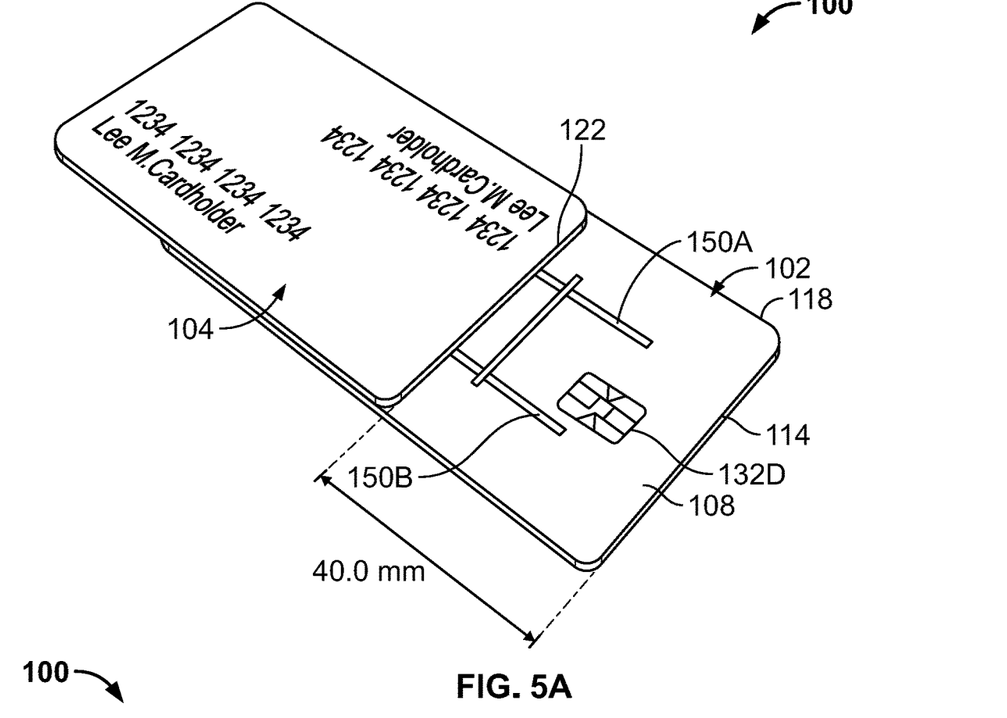
FIGS. 5A-5B depict operation of the card assembly of FIG. 1A, in accordance with embodiments of the present disclosure.

Turing now to FIGS. 5A-5B, operation of the assembly 100 according to embodiments of the present disclosure will be described in greater detail. Depending on which account the user would like to use, the first and second cards 102, 104 are slidable relative to one another to selectively isolate each magnetic stripe 130A-130D and to selectively expose and cover each identification chip 132A-132D. For example, as shown in FIG. 5A, the second card 104 may be slid towards the second end 116 of the first card 102 to expose identification chip 132D, which is disposed along the second side 108 of the first card 102. The supports 138 (not shown) of the second card 104 may travel within the first channel 150A and the second channel 150B, stopping when the supports 138 abut the end walls of the first and second channels 150A, 150B. In this position, a perimeter of the second card 104 at the first end 122 may be separated from a perimeter of the first card 102 at the first end 114 by a distance of at least 40 mm to allow the identification chip 132D to be properly read.

Figure 5B:
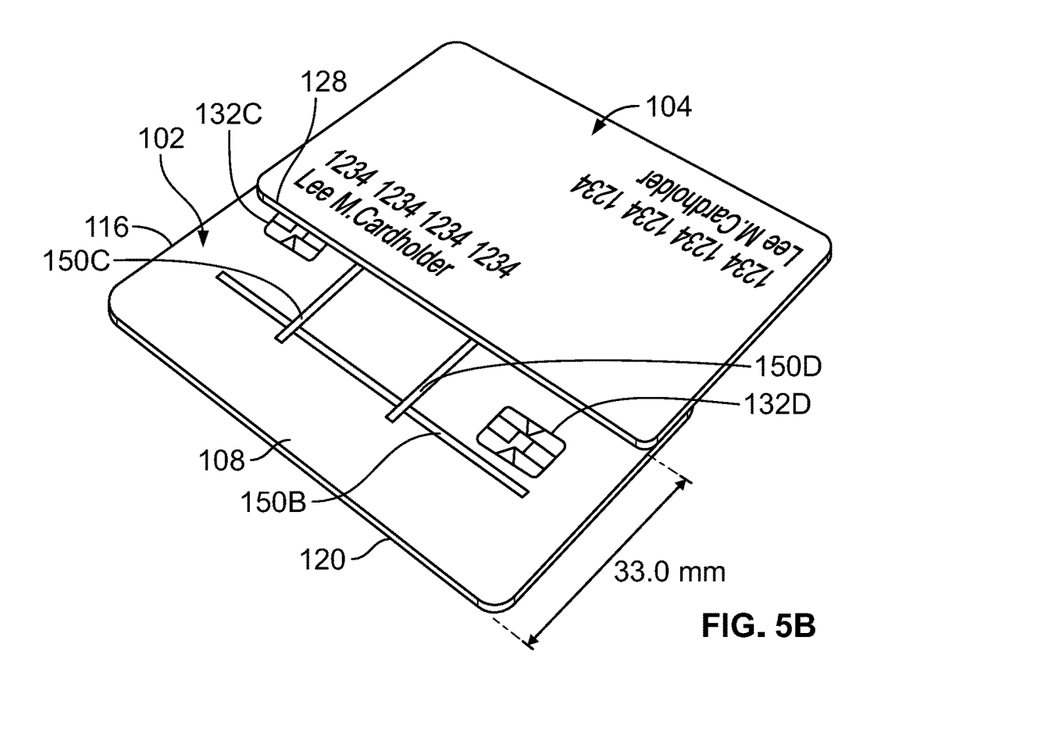

As shown in FIG. 5B, the second card 104 may be slid towards the first side 118 of the first card 102 to expose magnetic stripe 130D (not shown), which is disposed along the first side 106 of the first card 102. Similarly, magnetic stripe 130A (not shown) may be exposed along the first side 110 of the second card 104. The supports 138 of the second card 104 may travel within the third channel 150C and the fourth channel 150D, stopping when the supports 138 abut the end walls of the third and fourth channels 150C, 150D. In this position, the perimeter of the second card 104 at the second side 128 may be separated from the perimeter of the first card 102 at the second side 120 by a distance of at least 33 mm to allow magnetic stripe 130D to be properly read.

Figure 6:
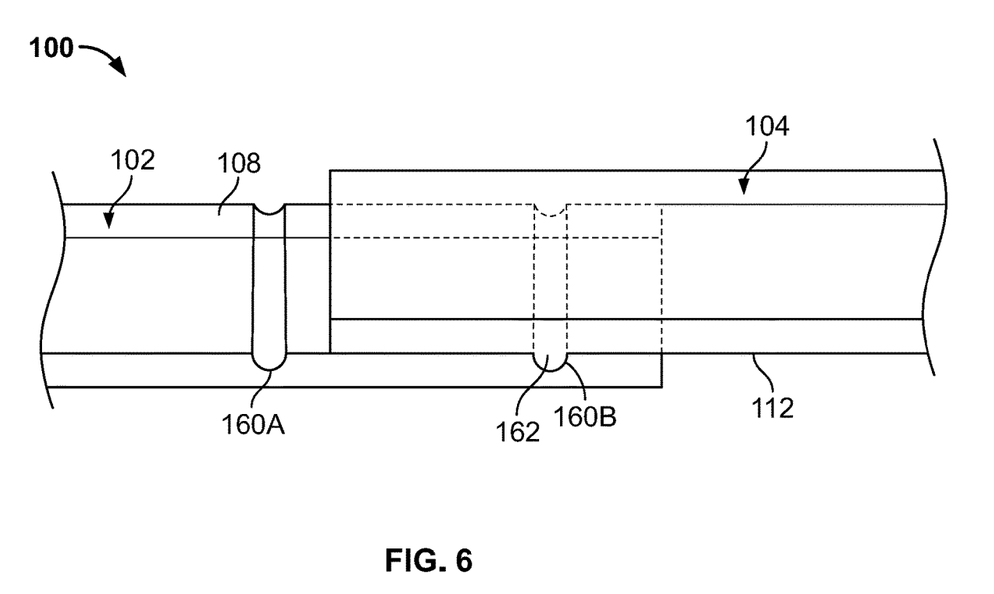
FIG. 6 is a perspective view of an example positioning stop, in accordance with embodiments of the present disclosure.

In some embodiments, as shown in FIG. 6, positioning of the first and second cards 102, 104 relative to one another may be aided by one or more positioning stops or mechanisms, such as a set of recesses 160A-160B operable to receive a corresponding protrusion 162. Although non-limiting, the set of recesses 160A-160B may be formed in the second side 108 of the first card 102, and the protrusion 162 may extend from the second side 112 of the second card 104. In the separated configuration shown, the protrusion 162 may be positioned within recess 160B to maintain the relative positions of the first and second cards 102, 104. When the first and second cards 102, 104 are aligned, the protrusion 162 may be positioned within recess 160A. It will be appreciated that the recesses 160A-160B and the protrusion 162 may take on a variety of different configurations in alternative embodiments.

Figure 7:
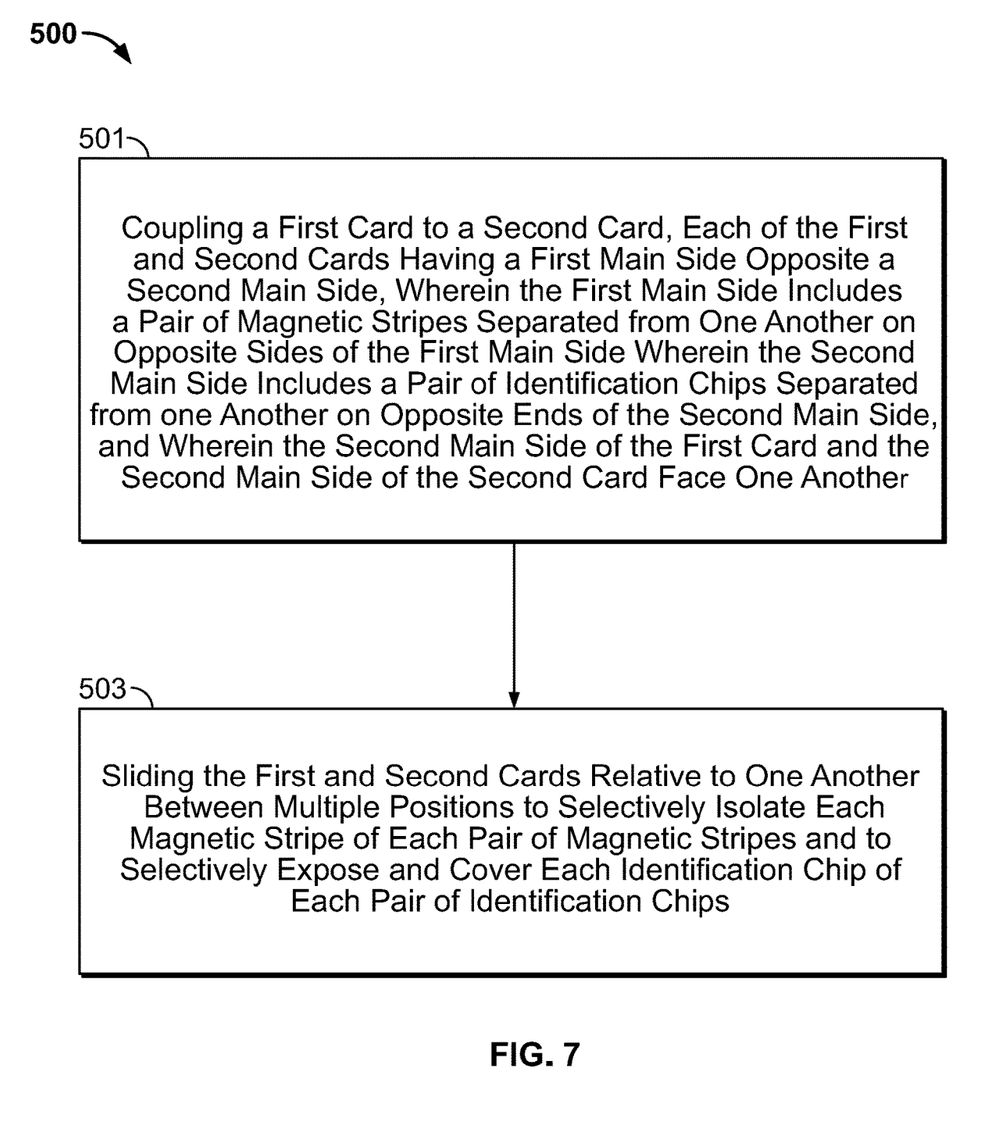
FIG. 7 illustrates a flowchart for performing methods in accordance with embodiments of the present disclosure.

Turning now to FIG. 9, a method 500 according to embodiments of the disclosure will be described in greater detail. At block 501, the method 500 may include coupling a first card to a second card, each of the first and second cards having a first main side opposite a second main side, wherein the first main side includes a pair of magnetic stripes separated from one another on opposite sides of the first main side and the second main side includes a pair of identification chips separated from one another on opposite ends of the second main side, and wherein the second main side of the first card and the second main side of the second card face one another. In some embodiments, each card of the assembly is a transaction card, such as a credit or debit card, a RFID passport, or an access card. The transaction card may include multiple layers each having one or more functions. In some embodiments, the identification chips may be any microprocessor device configured to exchange data electromagnetically, such as an EMV or RFID chip. The identification chip may include a radio frequency inductor, volatile or non-volatile memory storage, a microprocessor, circuitry logic, and/or an antenna.

At block 503, the method 500 may include sliding the first and second cards relative to one another between multiple positions to selectively isolate each magnetic stripe of each pair of magnetic stripes and to selectively expose and cover each identification chip of each pair of identification chips.

In some embodiments, the method 500 may include providing a set of channels formed in the first card, providing a set of supports extending from the second card, positioning the set of supports within the set of channels to allow the first and second cards to slide relative to one another along a first direction and along a second direction, wherein the first and second directions are perpendicular to one another.

In some embodiments, the method 500 may include providing a first pair of channels extending parallel to the pair of magnetic stripes, providing a second pair of channels intersecting the first pair of channels, and moving the set of supports between the first and second pairs of channels as the first and second cards slide relative to one another. In some embodiments, the method 500 may further include sliding the first and second cards relative to one another along a first direction and along a second direction, wherein the first and second cards are slid in the first direction to expose one identification chip of each of the pairs of identification chips, and wherein the first and second cards are slid in the second direction to expose one magnetic stripe of each of the pairs of magnetic stripes.

The foregoing discussion has been presented for purposes of illustration and description and is not intended to limit the disclosure to the form or forms disclosed herein. For example, various features of the disclosure may be grouped together in one or more aspects, embodiments, or configurations for the purpose of streamlining the disclosure. However, it should be understood that various features of the certain aspects, embodiments, or configurations of the disclosure may be combined in alternate aspects, embodiments, or configurations. Moreover, the following claims are hereby incorporated into this Detailed Description by this reference, with each claim standing on its own as a separate embodiment of the present disclosure.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

The term "adhesive" used herein may refer to any type of substance used for sticking objects or materials together and may be classified in a variety of ways depending on their chemistries (e.g. epoxies, polyurethanes, polyimides), their form (e.g. paste, liquid, film, pellets, tape), their type (e.g. hot melt, reactive hot melt, thermosetting, pressure sensitive, contact, etc.), or their load carrying capability (structural, semi-structural, or non-structural).

The use of "including," "comprising," or "having" and variations thereof herein is meant to encompass the items listed thereafter and equivalents thereof as well as additional items. Accordingly, the terms "including," "comprising," or "having" and variations thereof are open-ended expressions and can be used interchangeably herein.

The phrases "at least one", "one or more", and "and/or", as used herein, are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present disclosure, and do not create limitations, particularly as to the position, orientation, or use of this disclosure. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

Furthermore, identification references (e.g., primary, secondary, first, second, third, fourth, etc.) are not intended to connote importance or priority, but are used to distinguish one feature from another. The drawings are for purposes of illustration only and the dimensions, positions, order and relative sizes reflected in the drawings attached hereto may vary. Although non-limiting, the assembly 100 and the card 200 described herein may have standardized dimensions. For example, ISO/IEC 7816 is an international standard related to electronic identification cards with contacts, especially smart cards, managed jointly by the International Organization for Standardization (ISO) and the International Electrotechnical Commission (IEC). There are other standards, however, such as ISO/IEC 14443 for contactless cards (PayPass, PayWave, ExpressPay). A further standard ISO/IEC 7810 ID-1, with which most credit cards are compliant, defines dimensions as 85.60×53.98 mm (3.370×2.125 in) and a thickness of 0.76 mm (0.030 in).

Furthermore, the terms "substantial" or "substantially," as well as the terms "approximate" or "approximately," can be used interchangeably in some embodiments, and can be described using any relative measures acceptable by one of ordinary skill in the art. For example, these terms can serve as a comparison to a reference parameter, to indicate a deviation capable of providing the intended function. Although non-limiting, the deviation from the reference parameter can be, for example, in an amount of less than 1%, less than 3%, less than 5%, less than 10%, less than 15%, less than 20%, and so on.

Still furthermore, although the illustrative method 500 is described above as a series of acts or events, the present disclosure is not limited by the illustrated ordering of such acts or events unless specifically stated. For example, some acts may occur in different orders and/or concurrently with other acts or events apart from those illustrated and/or described herein, in accordance with the disclosure. In addition, not all illustrated acts or events may be required to implement a methodology in accordance with the present disclosure. Furthermore, the method 500 may be implemented in association with the formation and/or processing of structures illustrated and described herein as well as in association with other structures not illustrated.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, the present disclosure has been described herein in the context of a particular implementation in a particular environment for a particular purpose. Those of ordinary skill in the art will recognize the usefulness is not limited thereto and the present disclosure may be beneficially implemented in any number of environments for any number of purposes. Thus, the claims set forth below are to be construed in view of the full breadth and spirit of the present disclosure as described herein.

What is claimed is:

1. A card assembly, comprising:
a first card including a first card first side opposite a first card second side, the first card first side including a first pair of magnetic stripes separated from one another and the first card second side including a first pair of identification chips separated from one another; and
a second card coupled to the first card, the second card including a second card first side opposite a second card second side, the second card first side including a second pair of magnetic stripes separated from one another and the second card second side including a second pair of identification chips separated from one another, wherein the first card second side and the second card second side face one another, wherein the first and second cards are slidable relative to one another along a first direction, in a first channel, and along a second direction, in a second channel, wherein the first and second channels intersect one another, and wherein the first and second cards are slidable relative to one another between multiple positions to selectively expose and cover each identification chip of the first and second pairs of identification chips.

2. The card assembly of claim 1, wherein the first and second directions are perpendicular to one another.

3. The card assembly of claim 1, the first card comprising:
a first card first end opposite a first card second end, wherein the first pair of magnetic stripes extend between the first card first end and the first card second end; and
a first card first side opposite a first card second side, wherein a first magnetic stripe of the first pair of magnetic stripes is positioned along the first card first side and a second magnetic stripe of the first pair of magnetic stripes is positioned along the first card second side.

4. The card assembly of claim 3, further comprising:
a set of channels formed in the first card, wherein the first and second channels are part of the set of channels; and
a set of supports extending from the second card, wherein the set of supports is operable to engage the set of channels.

5. The card assembly of claim 4, wherein the set of channels comprises:
a first pair of channels extending parallel to the first pair of magnetic stripes wherein the first channel is part of the first pair of channels; and
a second pair of channels intersecting the first pair of channels, wherein the second channel is part of the second pair of channels, and wherein the set of supports may traverse between the first and second pairs of channels as the first and second cards slide relative to one another.

6. The card assembly of claim 5, the second card comprising:
a second card first end opposite a second card second end, wherein the second pair of magnetic stripes extend between the second card first end and the second card second end; and
a second card first side opposite a second card second side, wherein a first magnetic stripe of the second pair of magnetic stripes is positioned along the second card first side and a second magnetic stripe of the second pair of magnetic stripes is positioned along the second card second side.

7. The card assembly of claim 5, wherein the set of supports comprises a pair of tabs separated from one another, wherein the pair of tabs are slidable within the first and second pairs of channels.

8. The card assembly of claim 7, wherein each of the pair of tabs includes a surface extending from the second card second side at a non-zero angle relative to a plane oriented perpendicular to the second card second side, and wherein the surface is engaged with a corresponding channel surface of the first pair of channels and the second pair of channels to couple the first and second cards together.

9. The card assembly of claim 5, wherein each channel of the first pair of channels includes a first end wall opposite a second end wall, wherein in the case at least one support of the set of supports is in abutment with the first end wall, a perimeter of the second card at the second card second end is separated from a perimeter of the first card at the first card second end by a distance of at least 40 millimeters.

10. The card assembly of claim 5, wherein each channel of the second pair of channels includes a first end wall opposite a second end wall, wherein in the case at least one support of the set of supports is positioned against the first end wall, a perimeter of the second card at the second card second side is separated from a perimeter of the first card at the first card second side by a distance of at least 33 millimeters.

11. A transaction card assembly, comprising:
a first card coupled to a second card, each of the first and second cards having a first main side opposite a second main side, wherein the first main side includes a pair of magnetic stripes separated from one another and the second main side includes a pair of identification chips separated from one another, wherein the second main side of the first and second cards face one another, wherein the first and second cards are slidable relative to one another along a first direction, in a first channel, and along a second direction, in a second channel, wherein the first and second channels intersect one another, and wherein the first and second cards are slidable relative to one another between multiple positions to selectively expose and cover each identification chip of each pair of identification chips.

12. The transaction card assembly of claim 11, further comprising a set of supports extending from the second card, wherein the set of supports is positioned within the first and second channels to allow the first and second cards to slide relative to one another along the first direction and along the second direction, and wherein the first and second directions are perpendicular to one another.

13. The transaction card assembly of claim 12, wherein the first channel is part of a first pair of channels extending parallel to the pair of magnetic stripes, and wherein the second channel is part of a second pair of channels intersecting the first pair of channels, wherein the set of supports may traverse the first pair of channels or the second pair of channels as the first and second cards slide relative to one another.

14. The transaction card assembly of claim 13, wherein the set of supports comprises at least four tabs.

15. The transaction card assembly of claim 14, wherein each tab of the at least four tabs includes a surface extending from the second main side of the second card at a non-zero angle relative to a plane oriented perpendicular to the second main side of the second card, and wherein the surface is operable to engage a corresponding channel surface of the first pair of channels or the second pair of channels to couple the first and second cards together.

16. The transaction card assembly of claim 14, wherein each channel of the first and second pairs of channels includes a first end wall opposite a second end wall, wherein in the case a first tab of the at least four tabs is in abutment with the first end wall of the first pair of channels, a perimeter of the second card at a second card second end is separated from a perimeter of the first card at first card second end by a distance of at least 40 millimeters, and wherein in the case a second tab of the at least four tabs is in abutment with the first end wall, a perimeter of the second card at a second card second side is separated from a perimeter of the first card at a first card second side by a distance of at least 33 millimeters.

17. A method, comprising:

forming a set of channels in a first card, wherein the set of channels includes a first channel and a second channel, and wherein the first and second channels intersect one another;

providing a set of supports extending from a second card;

coupling the first card to the second card together by positioning the set of supports within the first and second channels, each of the first and second cards having a first main side opposite a second main side, wherein the first main side includes a pair of magnetic stripes separated from one another on opposite sides of the first main side, wherein the second main side includes a pair of identification chips separated from one another on opposite ends of the second main side, and wherein the second main side of the first card and the second main side of the second card face one another; and sliding the set of supports within the first and second channels to move the first and second cards between multiple positions to selectively expose and cover each identification chip of each pair of identification chips, wherein the first and second cards are slidable relative to one another along a first direction and along a second direction.

18. The method of claim 17, wherein the first and second directions are perpendicular to one another.

19. The method of claim 18, further comprising:

providing a first pair of channels extending parallel to the pair of magnetic stripes, wherein the first channel is part of the first pair of channels;

providing a second pair of channels intersecting the first pair of channels, wherein the second channel is part of the second pair of channels; and moving the set of supports between the first and second pairs of channels as the first and second cards slide relative to one another.

20. The method of claim 17, wherein the first and second cards are slid in the first direction to expose one identification chip of each of the pairs of identification chips, and wherein the first and second cards are slid in the second direction to isolate one magnetic stripe of each of the pairs of magnetic stripes.

* * * * *